United States Patent
Ishikawa et al.

(10) Patent No.: US 9,534,321 B2
(45) Date of Patent: Jan. 3, 2017

(54) MONOFILAMENT FOR MOWING

(71) Applicants: SANYO TEGUSU CO., LTD., Tokorozawa-shi, Saitama (JP); TORAY INDUSTRIES, INC., Tokyo (JP)

(72) Inventors: Toshio Ishikawa, Tokorozawa (JP); Masanori Kobayashi, Ichihara (JP); Shinya Kuroda, Nagoya (JP); Takayuki Hase, Ichihara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/403,474

(22) PCT Filed: Apr. 19, 2013

(86) PCT No.: PCT/JP2013/061580
§ 371 (c)(1),
(2) Date: Nov. 24, 2014

(87) PCT Pub. No.: WO2013/179801
PCT Pub. Date: Dec. 5, 2013

(65) Prior Publication Data
US 2015/0099836 A1    Apr. 9, 2015

(30) Foreign Application Priority Data

May 29, 2012  (JP) ................. 2012-121755
Sep. 21, 2012  (JP) ................. 2012-208025

(51) Int. Cl.
*D01F 1/10*  (2006.01)
*D01F 6/92*  (2006.01)
*D01F 6/62*  (2006.01)
*A01D 34/416*  (2006.01)

(52) U.S. Cl.
CPC .......... *D01F 6/625* (2013.01); *A01D 34/4168* (2013.01); *D01F 1/10* (2013.01); *D01F 6/92* (2013.01)

(58) Field of Classification Search
CPC ............. D01F 1/10; D01F 6/92; D01F 6/625; A10D 34/4168

USPC ........................................... 524/314
See application file for complete search history.

(56) References Cited

U.S. PATENT DOCUMENTS

| | | | | |
|---|---|---|---|---|
| 6,135,987 | A * | 10/2000 | Tsai | A61F 13/15252 264/165 |
| 2002/0132960 | A1* | 9/2002 | Haile | A61L 15/225 528/272 |
| 2002/0188041 | A1* | 12/2002 | Bond | D01F 6/92 524/47 |
| 2005/0228092 | A1 | 10/2005 | Fujita et al. | |
| 2006/0159918 | A1* | 7/2006 | Dugan | D01F 6/04 428/364 |
| 2011/0065573 | A1 | 3/2011 | McEneany et al. | |

FOREIGN PATENT DOCUMENTS

| | | |
|---|---|---|
| CN | 1865327 A | 11/2006 |
| CN | 101914274 A | 12/2010 |
| CN | 102046861 A | 5/2011 |
| JP | 2001-12898 A | 1/2001 |
| JP | 2002-105750 A | 4/2002 |
| JP | 2005-36327 A | 2/2005 |
| JP | 2008-000046 A | 1/2008 |
| JP | 2008-088363 A | 4/2008 |
| JP | 2011-241347 A | 12/2011 |
| KR | 805789 B * | 2/2008 |
| WO | WO 2008/075775 A1 | 6/2008 |

* cited by examiner

*Primary Examiner* — Kelechi Egwim
(74) *Attorney, Agent, or Firm* — Birch, Stewart, Kolasch & Birch, LLP

(57) ABSTRACT

A monofilament for mowing characterized by being produced by spinning a resin composition, said resin composition comprising 70-97 parts by weight of a polylactic acid resin (A) and 30-3 parts by weight of an adipate plasticizer (B), each relative to 100 parts by weight of the sum of the polylactic acid resin (A) and the adipate plasticizer (B). Thus, the monofilament for mowing, which is biodegradable, shows an excellent mowing performance and has a high breakage resistance and high abrasion resistance, is provided.

8 Claims, No Drawings

MONOFILAMENT FOR MOWING

TECHNICAL FIELD OF THE INVENTION

The present invention relates to a biodegradable monofilament used for a cord form grass cutter excellent in mowing performance, breakage resistance and abrasion resistance.

BACKGROUND ART OF THE INVENTION

A metal blade, which used to be employed as a cutter blade of grass cutters, might contact and damage a structural object when rotating. Accordingly, cord cutters made of nylon resin monofilament often have been used for safety reasons. The nylon cord is excellent in strength enough to be required for mowing. However the cord might abrade to be scattered or discarded on the ground. The nylon resin that is not naturally degradable to be left almost permanently is not excellent from a viewpoint of environmental protection.

Patent documents 1 and 2 disclose cords made of biodegradable resin. Such naturally degradable cords, which might abrade to be scattered, are excellent from a viewpoint of environmental protection.

However, these cords might snap from the base by shock of mowing. Also, they might deteriorate in mowing performance because of crack on the tip or have very bad abrasion resistance, so that they are not sufficiently practical.

PRIOR ART DOCUMENTS

Patent Documents

Patent document 1: JP2008-000046-A
Patent document 2: JP2002-105750-A
Patent document 3: JP-H07-184446-A

SUMMARY OF THE INVENTION

Problems to be Solved by the Invention

Accordingly it could be helpful to provide a monofilament for mowing, which is biodegradable and excellent in mowing performance, breakage resistance and abrasion resistance.

Means for Solving the Problems

The inventors reached the present invention by finding that a use of a polylactic acid resin (A) and an adipate plasticizer (B) could solve the above-described problems through their earnest research.

The present invention has the following configurations.

(1): A monofilament for mowing characterized by being made by spinning a resin composition comprising 70 to 97 parts by weight of a polylactic acid resin (A) and 30 to 3 parts by weight of an adipate plasticizer (B) relative to 100 parts by weight of the polylactic acid resin (A) and the adipate plasticizer (B).

(2): The monofilament for mowing (1), wherein an abrasion resistance determined by Taber's abrasion resistance test with H-18 abrasive wheel by applying 1,000 g load to rotate by 1,000 times is less than 3%.

(3): The monofilament for mowing (1) or (2), wherein the resin composition further comprises 10 to 400 parts by weight of a biodegradable aromatic-aliphatic polyester resin (C) relative to 100 parts by weight of the polylactic acid resin (A) and the adipate plasticizer (B).

(4): The monofilament for mowing (1) to (3), wherein the resin composition further comprises 0.01 to 3 parts by weight of an antioxidizing agent (D) relative to 100 parts by weight of the polylactic acid resin (A) and the adipate plasticizer (B).

Effect According to the Invention

The present invention can provide a monofilament for mowing, which is made from polylactic acid resin (A) and adipate plasticizer (B) and is excellent in mowing performance, breakage resistance and abrasion resistance.

EMBODIMENTS FOR CARRYING OUT THE INVENTION

A polylactic acid resin (A) used for a monofilament for mowing is a polymer that consists primarily of L-lactic acid and/or D-lactic acid and may contain copolymerization components other than the lactic acid. The copolymerization component units may be constituted by polycarboxylic acid, polyhydric alcohol, hydroxy carboxylic acid or lactone. The polycarboxylic acid may be oxalic acid, malonic acid, succinic acid, glutaric acid, adipic acid, azelaic acid, sebacic acid, dodecanedione acid, fumaric acid, cyclohexane dicarboxylic acid, terephthalic acid, isophthalic acid, phthalic acid, 2,6-naphthalenedicarboxylic acid, anthracene dicarboxylic acid, 5-sodium sulfoisophthalic acid or 5-tetrabutyl phosphonium sulfoisophthalic acid. The polyhydric alcohol may be ethylene glycol, propylene glycol, butanediol, heptanediol, hexanediol, octanediol, nonanediol, decanediol, 1,4-cyclohexanedimethanol, neopentylglycol, glycerin, pentaerythritol, bisphenol A, an aromatic polyhydric alcohol made by adding ethylene oxide to bisphenol, diethylene glycol, triethylene glycol, polyethylene glycol, polypropylene glycol or polytetramethylene glycol. The hydroxy carboxylic acid may be glycolic acid, 3-hydroxybutyric acid, 4-hydroxybutyric acid, 4-hydroxy valeric acid, 6-hydroxy caproic acid, hydroxy benzoic acid. The lactone may be glycolide, ε-caprolacton glycolide, ε-caprolactone, β-propiolactone, δ-butyrolactone, β- or γ-butyrolactone, pivalolactone or δ-valerolactone. It is preferable that such copolymerization units are contained by 0 to 30 mol %, preferably 0 to 10 mol %, among total monomer units of 100 mol %.

It is preferable that the polylactic acid resin (A) having a high optical purity of lactic acid is contained, from viewpoints of mechanical property and thermal characteristics. Concretely, it is preferable that L-lactic acid or D-lactic acid is contained by 80% or more in total lactic acid of the polylactic acid resin (A).

It is also preferable that a polylactic acid containing L-lactic acid by 80% or more is contained together with another polylactic acid containing D-lactic acid by 80% or more.

The polylactic acid (A) may be denaturalized one and is preferably maleic anhydride-modified polylactic acid resin, epoxy-modified polylactic acid resin or amine-modified polylactic acid resin, so that mechanical property as well as thermal resistance tends to improve.

The polylactic acid resin (A) can be prepared by a conventional polymerization method such as direct polymerization method from lactic acid and ring-opening polymerization method through lactide.

Although the molecular weight and molecular weight distribution of the polylactic acid resin (A) are not limited in particular, it is preferable that a weight average molecular weight is 100,000 or more, preferably 150,000 or more, and more preferably 180,000 or more. The upper limit is preferably 400,000 or less, from a viewpoint of fluidity at the time of molding. The said weight average molecular weight means a weight average molecular weight in terms of polymethylmethacrylate (PMMA) that has been measured by a gel permeation chromatography (GPC).

Although not limited in particular, it is preferable that a melting point of the polylactic acid resin (A) is 120° C. or more, preferably 150° C. or more. Such a desirable polylactic acid resin (A) having a high melting point tends to have a high optical purity, and therefore the polylactic acid resin preferably has a high optical purity.

From a viewpoint of thermal resistance, it is preferable that the polylactic acid resin (A) is a polylactic acid stereocomplex. The polylactic acid stereocomplex may be made from poly-L-lactic acid and poly-D-lactic acid by a melt-mixing method, a solution-mixing method or a solid-phase mixing method. It is preferable that the poly-L-lactic acid contains L-isomer by 90 mol % or more, preferably 95 mol % or more, and more preferably 98 mol % or more while the poly-D-lactic acid contains D-isomer by 90 mol % or more, preferably 95 mol % or more, and more preferably 98 mol % or more. It is possible that the polylactic acid stereocomplex is made by mixing poly-L-lactic acid and poly-D-lactic acid having a weight average molecular weight of 100,000 or more. However, it is preferable that one of poly-L-lactic acid and poly-D-lactic acid has a weight average molecular weight of 100,000 or less, preferably 50,000 or less while the other has a weight average molecular weight of more than 100,000, preferably 120,000 or more. It is preferable that the polylactic acid stereocomplex is made from a block copolymer of poly-L-lactic acid and poly-D-lactic acid, namely a stereo block polylactic acid, from a viewpoint of easy formation of the polylactic acid stereocomplex.

An adipate plasticizer (B) is an ester compound of adipic acid and two or more kinds of alcohols or ether alcohols. The alcohol as a raw material of the adipate plasticizer (B) may be methanol, ethanol, 1-propanol, 2-propanol, 1-butanol, 2-butanol, 2-methyl-1-propanol, 1,1-dimethyl-1-ethanol, pentanol, hexanol, heptanol, octanol, phenol, benzyl alcohol, or phenethyl alcohol. The alcohol is preferably methanol, ethanol, 1-propanol, 1-butanol, pentanol, hexanol, heptanol, octanol, benzyl alcohol, phenethyl alcohol. It is more preferably benzyl alcohol, 1-butanol, octanol, or phenethyl alcohol.

The ether alcohol as a raw material of the adipate plasticizer (B) may be ethylene oxide adduct or propylene oxide adduct of the above-described alcohol. The ethylene oxide adduct may be ethylene glycol monomethyl ether, ethylene glycol monoethyl ether, ethylene glycol monobutyl ether, ethylene glycol monophenyl ether, ethylene glycol monobenzyl ether, diethylene glycol monomethyl ether, diethylene glycol monoethyl ether, diethylene glycol monobutyl ether, diethylene glycol monophenyl ether, diethylene glycol monobenzyl ether, triethylene monoglycol monomethyl ether, triethylene glycol monoethyl ether, triethylene glycol monobutyl ether, triethylene glycol monophenyl ether, or triethylene glycol monobenzyl ether. The propylene oxide adduct may be propylene glycol monomethyl ether, propylene glycol monoethyl ether, propylene glycol monobutyl ether, propylene glycol monophenyl ether, propylene glycol monobenzyl ether, dipropylene glycol monomethyl ether, dipropylene glycol monoethyl ether, dipropylene glycol monobutyl ether, dipropylene glycol monophenyl ether, dipropylene glycol monobenzyl ether, tripropylene glycol monomethyl ether, tripropylene glycol monoethyl ether, tripropylene glycol monobutyl ether, tripropylene glycol monophenyl ether, or tripropylene glycol monobenzyl ether.

It is preferable to employ the ethylene glycol such as diethylene glycol monomethyl ether, diethylene glycol monoethyl ether, diethylene glycol monobutyl ether, triethylene glycol monomethyl ether, triethylene glycol monoethyl ether, triethylene glycol monobutyl ether. It is more preferable to employ diethylene glycol monomethyl ether, diethylene glycol monoethyl ether, or diethylene glycol monobutyl ether.

If the adipate plasticizer (B) has a small number average molecular weight, its stability is generally low and the product surface may have a stain or blocking from a bleed-out in spite of a high plasticization ability. Therefore, it is preferable that a number average molecular weight of the mixed group ester is 200 to 1,500, preferably 300 to 1,000.

It is preferable that the polylactic acid resin (A) of 70 to 79 parts by weight and the adipate plasticizer (B) of 30 to 3 parts by weight are contained in total 100 parts by weight. The adipate plasticizer (B) of less than 3 parts by weight might deteriorate breakage resistance in mowing. The adipate plasticizer (B) of more than 30 parts by weight might cause a bleed-out to stain the surface. It is preferable that the adipate plasticizer (B) is contained by 10 to 25 parts by weight.

It is possible that the monofilament for mowing further contains a biodegradable aromatic-aliphatic polyester (C), in order to prevent aftercontraction after fiber spinning.

The biodegradable aromatic-aliphatic polyester resin (C) may be made by introducing an aromatic ring between aliphatic chains to reduce crystallinity. It may be prepared by condensing an aromatic dicarboxylic acid component, an aliphatic dicarboxylic acid component and an aliphatic diol component. The aromatic dicarboxylic acid component may be isophthalic acid, terephthalic acid or 2,6-naphthalenedicarboxylic acid. The aliphatic dicarboxylic acid component may be succinic acid, adipic acid, suberic acid, sebacic acid, or dodecanedioic acid. The aliphatic dial component may be ethylene glycol, 1,4-butanediol or 1,4-cyclohexanedimethanol. It is possible that two kinds each of the aromatic dicarboxylic acid component, the aliphatic dicarboxylic acid component and aliphatic diol component are contained.

It is preferable that the aromatic dicarboxylic acid component is terephthalic acid, the aliphatic dicarboxylic acid component is adipic acid, and the aliphatic diol component is 1,4-butanediol. These materials can easily be obtained industrially and commercially. From these materials, polybutylene adipate terephthalate resin is supposed to be made as the biodegradable aromatic-aliphatic polyester resin (C).

The biodegradable aromatic-aliphatic polyester resin (C) may be a condensate of tetramethylene adipate and terephthalate or a condensate of polybutylene adipate and terephthalate. As the condensate of tetramethylene adipate and terephthalate, "Eastar Bio" made by Eastman Chemical Company is commercially available. As the condensate of polybutylene adipate and terephthalate, "Ecoflex" made by BASF Company is commercially available.

It is preferable that the biodegradable aromatic-aliphatic polyester resin (C) is contained by 10 to 400 parts by weight, preferably 100 to 350 parts by weight, in total 100 parts by weight of the polylactic acid resin (A) and the adipate plasticizer (B). The biodegradable aromatic-aliphatic polyester resin (C) of less than 10 parts by weight might not be sufficient to suppress aftercontraction after fiber spinning while that of more than 400 parts by weight might decrease the surface hardness to deteriorate in abrasion resistance.

It is possible that the monofilament for mowing further contains an antioxidizing agent (D), in order to improve thermal stability. The antioxidizing agent may be hindered phenolic compound, phosphite compound, thioether compound, or vitamin-based compound.

The hindered phenolic compound may be n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], 2,2'-methylenebis-(4-methyl-t-butyl phenol), triethylene glycol-bis-[3-(3-t-butyl-5-methyl-4-hydroxyphenyl)-propionate], tetrakis[methylene-3-(3',5'-di-t-butyl-4'-hydroxyphenyl[propionate]methane, 3,9-bis[2-{3-(3-t-butyl-4-hydroxy-5-methylphenyl)propionyloxy}-1,1-dimethyl ethyl]2,4,8,10-tetraoxaspiro(5,5)undecane, N,N'-bis-3-(3',5'-di-t-butyl-4'-hydroxyphenyl) propionyl hexamethylene diamine, N,N'-tetramethylene-bis-3-(3'-methyl-5'-t-butyl-4'-hydroxy phenol)propionyl diamine, N,N'-bis-[3-(3,5-di-t-butyl-4-hydroxy phenol)propionyl]hydrazine, N-salicyloyl-N'-salicylidene hydrazine, 3-(N-salicyloyl) amino-1,2,4-triazole, N,N-bis[2-[3-(3,5-di-t-butyl-4-hydroxyphenyl)propionyloxy]ethyl[oxyamide, pentaerythrityl-tetrakis[3-(3,5-di-t-butyl-4-hydroxyphenyl] propionate], N,N'-hexamethylene bis-(3,5-di-t-butyl-4-hydroxy-hydrocinnamide or the like. It is preferable to employ triethylene glycol-bis-[3-(3-t-butyl-5-methyl-4-hydroxyphenyl)-propionate], tetrakis[methylene-3-(3',5'-di-t-butyl-4'-hydroxyphenyl]propionate]methane, 1,6-hexanediol-bis-[3-(3,5-di-t-butyl-4-hydroxyphenyl)-propionate], pentaerythrityl-tetrakis[3-(3,5-d i-t-butyl-4-hydroxyphenyl] propionate], or N,N'-hexamethylene bis-(3,5-di-t-butyl-4-hydroxy-hydrocinnamide. The hindered phenol-based compound has product names such as "ADEKA STAB" "AO-20, AO-30, AO-40, AO-50, AO-60, AO-70, AO-80 and AO-330 made by Adeka Corporation, "IRGANOX" 245, 259, 565, 1010, 1035, 1076, 1098, 1222, 1330, 1425, 1520, 3114 and 5057 made by Ciba Specialty Chemicals, "Sumilizer" BHT-R, MDP-S, BBM-S, WX-R, NW, BP-76, BP-101, GA-80, GM and GS, made by Sumitomo Chemical Co., Ltd. and "CYANOX" CY-1790 made by Cyanamid Company.

It is preferable that the phosphite compound has at least one P—O bond binding to an aromatic group. It may be tris(2,4-di-t-butyl phenyl)phosphite, tetrakis(2,4-di-t-butyl phenyl)4,4'-biphenylene phosphonite, bis(2,4-di-t-butyl phenyl)pentaerythritol-di-phosphite, bis(2,6-di-t-butyl-4-methylphenyl)pentaerythritol-di-phosphite, 2,2-methylene bis(4,6-di-t-butyl phenyl)octyl phosphite, 4,4'-butylidene-bis(3-methyl-6-t-butyl phenyl-di-tridecyl)phosphite, 1,1,3-tris(2-methyl-4-ditridecyl phosphite-5-t-butyl-phenyl)butane, tris(mixed mono- and di-nonyl phenyl)phosphite, tris (nonyl phenyl)phosphite, 4,4'-isopropylidene bis(phenyl-dialkyl phosphite). It is preferable to employ tris(2,4-di-t-butyl phenyl) phosphite, 2,2-methylene bis(4,6-di-t-butyl phenyl)octyl phosphite, bis(2,6-di-t-butyl-4-methylphenyl) pentaerythritol-di-phosphite, tetrakis(2,4-di-t-butyl phenyl)-4,4'-biphenylene phosphonite. The phosphite compound has product names such as "ADEKA STAB" PEP-4C, PEP-8, PEP-11C, PEP-24G, PEP-36, HP-10, 2112, 260, 522A, 329A, 1178, 1500, C, 135A, 3010 and TPP made by Adeka Corporation, "IRGAFOS" 168," made by Ciba Specialty Chemicals, "Sumilizer" P-16 made by Sumitomo Chemical Co., Ltd, "Sandostab" P-EPQ made by Clariant Company, and "Weston" 618, 619G and 624 made by GE Company.

The thioether compound may be dilauryl thiodipropionate, ditridecyl thiodipropionate, dimyristyl thiodipropionate, distearyl thiodipropionate, pentaerythritol-tetrakis(3-lauryl thiopropionate), pentaerythritol-tetrakis(3-dodecyl thiopropionate), pentaerythritol-tetrakis(3-octadecyl thiopropionate), pentaerythritol-tetrakis(3-myristyl thiopropionate), pentaerythritol-tetrakis(3-stearyl thio propionate) or the like. The thioether compound has product names such as "ADEKA STAB" AO-23, AO-412S and AO-503A made by Adeka Corporation, "IRGANOX" PS802 made by Ciba Specialty Chemicals, "Sumilizer" TPL-R, TPM, TPS and TP-D made by Sumitomo Chemical Co., Ltd., DSTP, DLTP, DLTOIB and DMTP made by Yoshitomi Ltd., "SEENOX" 412S made by Shipro Kasei Kaisha Ltd., and "CYANOX" 1212 made by Cyanamid Company.

The vitamin-based compound may be a natural product such as d-α-tocopherol acetate, d-α-tocopherol succinate, d-α-tocopherol, d-β-tocopherol, d-γ-tocopherol, d-δ-tocopherol, d-α-tocotrienol, d-β-tocotrienol, d-γ-tocotrienol and d-δ-tocotrienol, or an synthetic product such as dl-α-tocopherol, dl-α-tocopherol acetate, dl-α-tocopherol calcium succinate and dl-α-tocopherol nicotinate. The vitamin-based antioxidizing agent has product names such as "tocopherol" made by Eisai Co., Ltd. and "IRGANOX" E201 made by Ciba Specialty Chemicals. It is preferable that the antioxidizing agent (D) is contained by 0.01 to 3 parts by weight in total 100 parts by weight of the resin composition. It is preferably 0.05 to 1 parts by weight, more preferably 0.05 to 0.3 parts by weight. The antioxidizing agent of less than 0.01 parts by weight might not sufficiently improve thermal stability while that of more than 3 parts by weight might deteriorate in mechanical strength.

As far as purposes of the present invention are not spoiled, the biodegradable resin may contain a bulking agent (glass fiber, carbon fiber, natural fiber, organic fiber, ceramics fiber, ceramic beads, asbestos, wollastonite, talc, clay, mica, sericite, zeolite, bentonite, montmorillonite, dolomite, kaolin, fine powder of silicic acid, feldspar powder, potassium titanate, white sand balloon, calcium carbonate, magnesium carbonate, silicon carbide, tungsten carbide, barium sulfate, calcium oxide, aluminum oxide, titanium oxide, aluminum silicate, silicon oxide, gypsum, novaculite, dawsonite, wood powder, paper powder, white clay or the like), an impact resistance improver (elastomer or the like), a stabilization agent (light stabilization agent or the like), a nucleating agent, a hydrolysis inhibitor, a chain extender, a flame retardant (bromine-based flame retardant, phosphorus-based flame retardant, antimonide, melamine compound), a lubricant, an antistat, a coloring agent including dye or pigment, or the like.

Hereinafter, a method of producing the monofilament will be explained. The polylactic acid resin (A) and adipate plasticizer (B) are added and the biodegradable aromatic-aliphatic polyester resin (C) and antioxidizing agent (D) are added as needed, with any mixing device by any mixing method. It is industrially advantageous that a continuous process can be performed with the device by the method. Various raw materials may be mixed by a predetermined proportion and introduced into a hopper of an extrusion molding machine to be melt-mixed to spin a monofilament continuously. Alternatively, components may be melt-mixed and then pelletized, so that the pellets can be subjected to a melt-spinning process to make a monofilament as needed afterwards. It is preferable that the components are pelletized once to mix them homogeneously. For the melt-mixing process, it is preferable that they are mixed at a low temperature within a short time as possible enough to prevent polymers from deteriorating and transubstantiating. The melt-mixing is usually performed at 150 to 250° C., as considering the melting point and mixture proportion of the resin.

Next, stretching processing and heat treatment process of the monofilament will be explained. The biodegradable resin is melt and extruded from a nozzle, and then is cooled to be solidified. An unstretched monofilament is obtained by cooling it in a water bath usually kept at 5 to 70° C. The unstretched monofilament may be successively stretched, or alternatively may be once rolled up and then stretched. It is important that the stretching treatment is performed in a wet stretching apparatus controlled at 40 to 150° C. after the extrusion extension process. The said wet stretching apparatus means a liquid bath containing warm water, saturated steam, glycerin, ethylene glycol, polyethylene glycol or the like. The bath temperature of 30° C. or less might have too high an elastic modulus to perform a sufficient stretching process. The bath temperature of 150° C. or more might have too low an elastic modulus to be sufficiently oriented. It is practically preferable that heated water or steam at 60 to 110° C. is employed.

The stretching process is performed by heating the unstretched monofilament at a predetermined velocity ratio between rollers, with a wet stretching apparatus for stretching provided between the rollers rotating at different speeds or a hot roll provided to transmit a heat from the feeding side. It is preferable that the velocity ratio between the rollers, that corresponds to an stretch ratio, is 3 to 10, preferably 3.5 to 8 while the velocity ratio. It is possible that the stretching process includes one or more steps. It is preferable that at least one step is a wet stretching step. The stretch ratio of less than 3 might not achieve a sufficient degree of stretch orientation and might decrease the strength. The stretch ratio of more than 10 might achieve an excessive degree of orientation to cause longitudinal crack or yarn breakage.

To manufacture the monofilament, processes of spinning—cooling—stretching are performed as followed by a heat treatment process. The heat treatment may improve the edge and durability. The reason why seems to be because a folding crystallization of an unoriented part or a part of oriented part stabilizes the structure. It is preferable that the heat treatment process is performed at 40 to 150° C. under dry-heat or wet-heat tension. The heat treatment process usually continues for 0.1 sec to 60 min. The heat treatment process may be performed successively after the stretching process, or alternatively, may be performed at any stage after rolling up the stretched yarn. The heat treatment temperature of less than 40° C. might not have a crystallization speed enough to perform a good heat setting. The temperature of more than 150° C. might make polymer chains mobile to relax the orientation through the stretching. It is possible that a twisting (torsion) process is performed on or before the heat treatment.

The monofilament may have any shape. The cross section may have a well-known shape of a round such as circle and ellipse, a polygon such as triangle, quadrilateral and pentagon, a star or the like. It is possible that a thickness is 0.1 to 5.0 mm in diameter, preferably 0.3 to 3.0 mm, although not limited in particular.

EXAMPLES

Hereinafter, details of the monofilament will be explained with Examples, although they don't limit the present invention in particular.

Raw materials employed will be described as follows.

(A) Polylactic Acid Resin (A-1) Polylactic acid resin: D-isomer 4%, Mw 220,000 (in terms of PMMA)

(A-2) Polylactic acid resin: D-isomer 1.4%, Mw 160,000 (in terms of PMMA)

(A-3) Polylactic acid resin: D-isomer 12%, Mw 220,000 (in terms of PMMA)

(B) Adipate Plasticizer (B-1) Diester of adipic acid and diethylene glycol monomethyl ether/benzyl alcohol: "DAIFATTY-101" made by Daihachi Chemical Industry Co., Ltd.

(B-2) Bis(butyl diethylene glycol)adipate: "BXA" made by Daihachi Chemical Industry Co., Ltd.

(C) Biodegradable Aromatic-Aliphatic Polyester Resin (C-1) Polybutylene adipate terephthalate: Ecoflex F made by BASF Company (D) Antioxidizing Agent (D-1) Pentaerythrityl-tetrakis[3-(3,5-t-butyl-4-hydroxyphenyl]propionate]: IRGANOX 1010 made by BASF Company (E) Resins Other than (A) and (C)

(E-1) Polybutylene succinate adipate: "Bionolle 3001" made by Showa Denko KK (E-2) Polycaprolactone: "Celgreen PH7" made by Daicel Corporation (E-3) Nylon 6/66 copolymer product "AMILAN CM6041" made by Toray Industries, Inc.

Measurement methods and evaluation methods in Examples and Comparative Examples will be described as follows.

(1) Weight Average Molecular Weight (Mw) of Polylactic Acid Resin

The weight average molecular weight is measured with a gel permeation chromatography (GPC) in terms of the standard PMMA. 0.1 mL of a sample solution of concentration 1 mg/mL is injected into a solvent of hexafluoroisopropanol flowing at flow rate 0.5 mL/min.

(2) Biodegradability

The biodegradability is determined according to JIS K6953 for 10 g of samples sectioned into 20 mm×20 mm square from a sheet of 100 μm thickness prepared with a hot press heated to 200° C. The compost is maintained at 58° C. for 90 days. The biodegradability is calculated from the quantity of carbon dioxide generated by microbes.

(3) Mowing Performance

The ultra auto 4 made by Makita Corporation is attached to a grass cutter (26 cc engine type) made by Maruyama MFg., Co. Inc., to which the monofilament for mowing is attached as projecting by 15 cm, and then hard weeds having heights of 50-70 cm are mown over 5 m square at constant engine rotation speed of 10,000 rpm. The time required for completing the mowing is measured and the breakage count is measured to evaluate a breakage resistance. The shorter the time required for the mowing is, the better a cutting edge sharpness is.

(4) Abrasion Resistance

A square plate of 150 mm×150 mm×3 mm is formed with an injection molding machine (Toshiba EC75SX) at 200° C. of cylinder temperature and 30° C. of mold temperature. Thus obtained sample piece is subjected to the Taber's abrasion resistance test according to JIS K7204, in which a weight reduction percentage is measured with H-18 abrasive wheel by applying 1,000 g load to rotate by 1,000 times. The less the weight reduction percentage is, the better the abrasion resistance is.

(5) Bleed-Out

The square plate obtained by the above-described method is heated in a hot wind oven at 80° C. The square plate is taken out and the surface is observed by eyes and touched by a hand, in order to evaluate the bleed-out existence.

(6) Thermal Stability

To evaluate color difference ΔE* between before and after the heat treatment, the square plate obtained by the above-described method is heated in a hot wind oven at 80° C. for 168 hours. The color difference ΔE* is determined with SM color computer (model: SM-3) made by Suga Test Instruments Co., Ltd.

(7) Aftercontraction

A monofilament for mowing cut into 1,000 mm lengths to be heated in a hot wind oven at 60° C. for 24 hours, to evaluate the aftercontraction.

Examples 1 to 13

Raw materials were mixed according to the proportion shown in Table 1 and then supplied by 15 kg/h through a raw material supply port to a twin-screw extruder "TEM-35B" (made by Toshiba Machine Co., Ltd.) with a vent and φ35 mm screws to be melt-mixed at 200° C. and 150 rpm of screw rotation speed. Pellets of resin composition were prepared by a pelletizer. Thus obtained resin composition were dried up with hot wind at 80° C. for 5 hours, and then subjected to various evaluations.

The resin composition was supplied to a single-screw extruder at 200° C. and the extrusion was taken up with the first roller as being led to a cooling bath at 50° C. to be cooled to make an unstretched monofilament for spinning a stretched monofilament. The monofilament having 2.4 mm diameter was prepared by stretching at 100° C. and stretch ratio of 5.0. Thus obtained monofilament was attached to a grass cutter to evaluate a mowing performance.

TABLE 1

| | Unit | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| (A) Polylactic acid resin | kind | A-1 | A-2 | A-3 | A-1 | A-1 | A-1 | A-1 | A-1 | A-1 | A-1 | A-1 | A-1 | A-1 |
| | parts by weight | 85 | 85 | 85 | 97 | 75 | 70 | 80 | 85 | 75 | 85 | 85 | 85 | 85 |
| (B) Adipate plasticizer | kind | B-1 | B-1 | B-1 | B-1 | B-1 | B-1 | B-2 | B-1 | B-1 | B-1 | B-1 | B-1 | B-1 |
| | parts by weight | 15 | 15 | 15 | 3 | 25 | 30 | 20 | 15 | 25 | 15 | 15 | 15 | 15 |
| (C) Biodegradable aromatic-aliphatic polyester resin | kind | | | | | | | | C-1 | C-1 | C-1 | C-1 | | |
| | parts by weight | | | | | | | | 10 | 175 | 400 | 450 | | |
| (D) Antioxidizing agent | kind | | | | | | | | | | | | D-1 | D-1 |
| | parts by weight | | | | | | | | | | | | 0.1 | 3 |
| Biodegradability | % | 98 | 98 | 98 | 99 | 97 | 97 | 98 | 93 | 85 | 73 | 70 | 98 | 94 |
| Mowing time | sec | 244 | 240 | 244 | 236 | 250 | 255 | 240 | 250 | 275 | 291 | 315 | 244 | 248 |
| Breakage count | times | 0 | 0 | 0 | 0 | 0 | 0 | 0 | 0 | 0 | 0 | 1 | 0 | 0 |
| Abrasion resistance | % | 0.9 | 0.8 | 0.9 | 0.7 | 1.0 | 1.1 | 1.0 | 1.0 | 1.4 | 2.5 | 3.4 | 0.9 | 1.1 |
| Bleed-out | — | ND | ND | ND | ND | ND | ND | ND | ND | ND | ND | ND | ND | ND |
| ΔE* | — | 1.5 | 1.5 | 1.5 | 1.3 | 1.6 | 1.6 | 1.5 | 1.6 | 1.7 | 2.0 | 2.4 | 0.8 | 0.7 |
| Aftercontraction | % | 8 | 8 | 7 | 7 | 11 | 13 | 9 | 3 | 1 | 1 | 1 | 8 | 8 |

Examples 1 to 7 show excellent results of mowing time, breakage resistance and abrasion resistance of a mixture of 70-95 parts by weight of polylactic acid resin (A) and 30-5 parts by weight of adipate plasticizer (B).

Examples 8 to 11 show small aftercontractions suppressed by adding 10-400 parts by weight of biodegradable aromatic-aliphatic polyester (C) to 100 parts by weight in total of polylactic acid resin (A) of 75-85 parts by weight and 25-15 parts by weight of adipate plasticizer (B).

Examples 12 and 13 show small tarnishes through the heat treatment process, suppressed by adding 0.1-3 parts by weight of antioxidizing agent (D) to a mixture of 85 parts by weight of polylactic acid resin (A) and 15 parts by weight of adipate plasticizer (B).

Comparative Example 1 to 8

Resin compositions and monofilaments were prepared by the same method as the Examples, except that the raw materials were mixed according to the proportion shown in Table 2.

TABLE 2

|  | Unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| (A) Polylactic acid resin | kind | A-1 | A-1 | A-1 |  |  |  |  |  |
|  | parts by weight | 100 | 98 | 65 |  |  |  |  |  |
| (B) Adipate plasticizer | kind |  | B-1 | B-1 |  | B-1 | B-1 | B-1 | B-1 |
|  | parts by weight |  | 2 | 35 |  | 15 | 15 | 15 | 15 |
| (C) Biodegradable aromatic-aliphatic polyester resin | kind |  |  |  | C-1 | C-1 |  |  |  |
|  | parts by weight |  |  |  | 100 | 85 |  |  |  |
| (D) Antioxidizing agent | kind |  |  |  |  |  |  |  |  |
|  | parts by weight |  |  |  |  |  |  |  |  |
| (E) Resins other than (A) and (C) | kind |  |  |  |  |  | E-1 | E-2 | E-3 |
|  | parts by weight |  |  |  |  |  | 85 | 85 | 100 |
| Biodegradability | % | 100 | 99 | 96 | 60 | 70 | 98 | 98 | 0 |
| Mowing time | sec | Imponderable | Imponderable | 262 | Imponderable | Imponderable | Imponderable | Imponderable | 283 |
| Breakage count | times | >10 | >10 | 0 | >10 | >10 | >10 | >10 | 0 |
| Abrasion resistance | % | 0.7 | 0.7 | 1.1 | 5.0 | 5.1 | 4.4 | 4.5 | 0.7 |
| Bleed-out | — | ND | ND | Detected | ND | Detected | Detected | Detected | ND |
| ΔE* | — | 1.5 | 1.5 | 1.6 | 2.5 | 2.5 | 2.6 | 2.7 | 3.0 |
| Aftercontraction | % | 1 | 2 | 15 | 5 | 8 | 8 | 8 | 0 |

Comparative Examples 1 to 5 show results of polylactic acid resin (A), adipate plasticizer (B), biodegradable aromatic-aliphatic polyester resin (C) and mixtures thereof mixed beyond a certain proportion characterized by the Examples. The breakage resistance greatly deteriorated and excessive plasticizer caused the bleed-out.

Comparative Examples 6 and 7 show bad breakage resistances of a mixture of adipate plasticizer (B) and biodegradable resin other than polylactic acid resin (A). Comparative Example 8 shows that the nylon resin didn't show any biodegradability.

INDUSTRIAL APPLICATIONS OF THE INVENTION

The monofilament for mowing of the present invention is a biodegradable monofilament excellent in mowing performance, breakage resistance and abrasion resistance.

The invention claimed is:

1. A monofilament suitable for mowing grass characterized by being made by spinning a resin composition comprising 70 to 97 parts by weight of a polylactic acid resin (A) and 30 to 3 parts by weight of an adipate plasticizer (B) relative to 100 parts by weight of the polylactic acid resin (A) and the adipate plasticizer (B),
   wherein the adipate plasticizer (B) is an ester compound of:
   adipic acid;
   an alcohol selected from the group consisting of benzyl alcohol, 1-butanol, octanol and phenethyl alcohol; and
   an ether alcohol selected from the group consisting of diethylene glycol monomethyl ether, diethylene glycol monoethyl ether and diethylene glycol monobutyl ether.

2. The monofilament suitable for mowing grass according to claim 1, wherein an abrasion resistance determined by Taber's abrasion resistance test with H-18 abrasive wheel by applying 1,000 g load to rotate by 1,000 times is less than 3%.

3. The monofilament suitable for mowing grass according to claim 1, wherein the resin composition further comprises 10 to 400 parts by weight of a biodegradable aromatic-aliphatic polyester resin (C) relative to 100 parts by weight of the polylactic acid resin (A) and the adipate plasticizer (B).

4. The monofilament suitable for mowing grass according to claim 1, wherein the resin composition further comprises 0.01 to 3 parts by weight of an antioxidizing agent (D) relative to 100 parts by weight of the polylactic acid resin (A) and the adipate plasticizer (B).

5. The monofilament suitable for mowing grass according to claim 2, wherein the resin composition further comprises 10 to 400 parts by weight of a biodegradable aromatic-aliphatic polyester resin (C) relative to 100 parts by weight of the polylactic acid resin (A) and the adipate plasticizer (B).

6. The monofilament suitable for mowing grass according to claim 2, wherein the resin composition further comprises 0.01 to 3 parts by weight of an antioxidizing agent (D)

relative to 100 parts by weight of the polylactic acid resin (A) and the adipate plasticizer (B).

7. The monofilament suitable for mowing grass according to claim 3, wherein the resin composition further comprises 0.01 to 3 parts by weight of an antioxidizing agent (D) relative to 100 parts by weight of the polylactic acid resin (A) and the adipate plasticizer (B).

8. The monofilament suitable for mowing grass according to claim 1, wherein the thickness is 0.3 to 3.0 mm in diameter.

* * * * *